United States Patent
Brown et al.

(10) Patent No.: US 6,690,940 B1
(45) Date of Patent: Feb. 10, 2004

(54) SYSTEM FOR SELECTIVE PREVENTION OF NON-EMERGENCY USE OF AN ELECTRONIC DEVICE

(76) Inventors: James W. Brown, 24 Neurys La., Newark, DE (US) 19702; George W. Brown, 27 Deer Cir., Bear, DE (US) 19701; Charles F. Brown, 119 Warfel Dr., Delaware City, DE (US) 19706

( * ) Notice: Subject to any disclaimer, the term of this patent is extended or adjusted under 35 U.S.C. 154(b) by 0 days.

(21) Appl. No.: 09/668,099

(22) Filed: Sep. 22, 2000

(51) Int. Cl.[7] .................................................. H04Q 7/20
(52) U.S. Cl. ..................... 455/456.4; 455/421; 455/411; 340/438; 340/439; 701/1; 701/36
(58) Field of Search ........................... 455/456.4, 404, 455/421, 432, 565, 457, 410, 411; 340/988, 426, 428, 506, 439, 438, 457, 468; 701/1, 2; 710/65, 14

(56) References Cited

U.S. PATENT DOCUMENTS

| | | | |
|---|---|---|---|
| 4,908,611 A | 3/1990 | Iino ............................ 340/705 |
| 5,148,153 A | 9/1992 | Haymond .................... 340/711 |
| 5,504,482 A | 4/1996 | Schreder ..................... 340/995 |
| 5,519,410 A | 5/1996 | Smalanskas et al. ........... 345/7 |
| 5,541,572 A | 7/1996 | Okamoto et al. ............ 340/438 |
| 5,548,764 A | 8/1996 | Duley et al. ................. 395/750 |
| 5,949,345 A | 9/1999 | Beckert et al. .............. 340/439 |
| 5,991,749 A | 11/1999 | Morrill, Jr. ................... 705/44 |
| 6,011,973 A | * | 1/2000 | Valentine et al. ........... 455/456 |
| 6,023,232 A | 2/2000 | Eitzenberger ............... 340/988 |
| 6,028,537 A | 2/2000 | Suman et al. ............... 340/988 |
| 6,088,586 A | 7/2000 | Haverty ...................... 455/422 |
| 6,122,682 A | * | 9/2000 | Andrews ....................... 710/65 |
| 6,134,447 A | * | 10/2000 | Havinis et al. ............. 455/456 |
| 6,225,897 B1 | * | 5/2001 | Doyle et al. ................ 340/468 |
| 6,230,017 B1 | * | 5/2001 | Andersson et al. ......... 455/456 |
| 6,233,448 B1 | * | 5/2001 | Alperovich et al. .... 455/456 X |
| 6,256,503 B1 | * | 7/2001 | Stephens .................... 455/456 |
| 6,256,558 B1 | * | 7/2001 | Sugiura et al. ................ 701/1 |
| 6,262,657 B1 | * | 7/2001 | Okuda et al. ............... 340/439 |

FOREIGN PATENT DOCUMENTS

| | | | |
|---|---|---|---|
| JP | 10-200961 A | * | 7/1998 |
| JP | 10-256979 A | * | 9/1998 |
| JP | 10-294970 A | * | 11/1998 |
| JP | 11-4190 A | * | 1/1999 |
| JP | 11-88954 A | * | 3/1999 |

* cited by examiner

Primary Examiner—Sinh Tran
(74) Attorney, Agent, or Firm—RatnerPrestia

(57) ABSTRACT

A system for selectively disabling use of at least selected features of a stand-alone electronic device under a predetermined set of conditions. The system establishes a state of the set of conditions as being satisfied or unsatisfied, communicates the state to the electronic device, and disables the selected features if the state is satisfied. In one embodiment, the system may be advantageously be used to prevent vehicular accidents by at least partially disabling non-emergency use of a wireless telephone in a moving vehicle. In another embodiment, the system may be used to disable features of an electronic device within a predetermined area having a boundary that is independent of a communications network cell.

31 Claims, 3 Drawing Sheets

SYSTEM FOR SELECTIVE PREVENTION OF NON-EMERGENCY USE OF AN ELECTRONIC DEVICE

TECHNICAL FIELD

This invention relates to communication devices, and more particularly to systems for preventing the non-emergency operation of wireless communication devices, such as in a moving vehicle.

BACKGROUND OF THE INVENTION

Along with the now-ubiquitous use of wireless communication devices, such as cellular phones, has come an increase in automobile accidents allegedly caused in part by distracted drivers operating their automobiles while simultaneously using cellular phones. In fact, some studies have suggested that operation of an automobile while talking on a cellular phone can be as dangerous or more dangerous than operating an automobile while under the influence of alcohol.

To help prevent further accidents, some communities have banned the use of cellular phones while driving, requiring the automobile operator to pull the car over to the side of the road prior to operating the cell phone. The observance of traffic laws is notoriously poor, however, and it can be expected that not every citizen will obey such new ordinances. Thus, there is a need to provide a more reliable means for prevention of the operation of the car and cellphone simultaneously.

Additionally, the increased use of wireless communication devices has so invaded everyday life, that many users seem to be unable to go anywhere without talking on their phone, much to the annoyance of those around them. In theaters, restaurants, or courtrooms, for example, the use of such devices can be annoying and may consequently be banned by the management of such establishments. Again, given human nature, reliance only on people obeying rules is often insufficient to prevent all use of the offending devices. Thus, the ability to selectively prevent the use of wireless communication devices within certain confines or under certain conditions is desirable.

SUMMARY OF THE INVENTION

In accordance with this invention, there is provided a system for, under a predetermined set of conditions, selectively disabling use of at least one feature of a stand-alone electronic device having a plurality of features. The system comprises the electronic device having the plurality of features, means for establishing a state of the set of conditions as being satisfied or unsatisfied, means for communicating the state to the electronic device, and means for disabling the selected features if the state is satisfied. The device may comprise a wireless communications device, such as a cellular telephone, or any electronic device, such as a computer. The predetermined set of conditions may comprise conditions indicating movement of a vehicle, location within a predetermined area, activation of a switch, or a combination thereof. The predetermined set of conditions may further comprise conditions indicating nonemergency use of the device.

Where the predetermined set of conditions comprises conditions indicating location within a predetermined area, the system may further comprise means for determining if a user is within a warning area adjacent the predetermined area, and means for warning a user that he or she is within the warning area.

The means for disabling the electronic device may reside within the electronic device, or if the electronic device comprises a wireless communications device usable through a service provider, the means for disabling the wireless communications device may additionally or instead reside at least in part with the service provider.

The system may specifically comprise a system for selectively at least partially disabling non-emergency use of a wireless telephone in a moving vehicle. Such system comprises means for establishing that the use is emergency or non-emergency use; means for establishing the state of the vehicle as acceptable or unacceptable for non-emergency use of the telephone; means for communicating the state to the wireless telephone, to a service provider for the wireless telephone, or both; and means for disabling non-emergency use of the telephone when the state of the vehicle is unacceptable.

The invention may further comprise a stand-alone electronic device having a plurality of features and adapted to have at least one feature selectively disabled under a predetermined set of conditions. Such a device comprises means for receiving a communication indicating that the set of conditions has been satisfied and means for disabling the selected feature in response to the communication indicating that the set of conditions has been satisfied. The invention may also comprise a wireless telephone adapted to be at least partially disabled for non-emergency use when in a vehicle, the telephone comprising means for establishing that the use is non-emergency use; means for receiving a communication indicating that the telephone should be at least partially disabled if the use is non-emergency use; and means for at least partially disabling non-emergency use of the telephone in response to the communication.

The invention also comprises a controller for use with a system for, under a predetermined set of conditions, providing a communication to cause at least one feature to be disabled of a stand-alone electronic device, wireless telephone, or combination thereof having a plurality of features. The controller comprises means for determining if the set of conditions has been satisfied and means for sending the communication to the electronic device, wireless telephone, or a service provider for the wireless telephone if the set of conditions are satisfied.

The invention also comprises computer program products for use with the stand-alone electronic device, wireless telephone, controller, or service provider for the wireless telephone. Such products comprise at least one program storage device readable by a machine, tangibly embodying a program of instructions executable by the machine to perform selected method steps. For selectively disabling use of at least one selected feature of a stand-alone electronic device under a predetermined set of conditions, the method steps comprise receiving a communication indicating that the set of conditions has been satisfied and disabling the feature in response to the communication. For at least partially disabling non-emergency use of a wireless telephone when in a vehicle, the method steps comprise determining whether an attempted use is emergency or non-emergency use, receiving an input indicating that non-emergency use should be disabled, and disabling non-emergency use of the telephone in response to the input. Such a program product may reside at least in part within the telephone, at least in part within a service provider for the telephone, or a combination thereof. To provide a communication to cause at least one feature to be disabled of a stand-alone electronic device, wireless telephone, or combination thereof under a predetermined set of conditions, the method steps for a controller comprise establishing a state of the set of conditions as being satisfied or unsatisfied and sending the communication to the electronic device, wireless telephone, or a service provider for the wireless telephone.

DETAILED DESCRIPTION OF INVENTION

The invention will next be illustrated with reference to the figures wherein similar numbers indicate the same elements in all figures. Such figures are intended to be illustrative rather than limiting and are included herewith to facilitate the explanation of the apparatus of the present invention.

Figure 1:
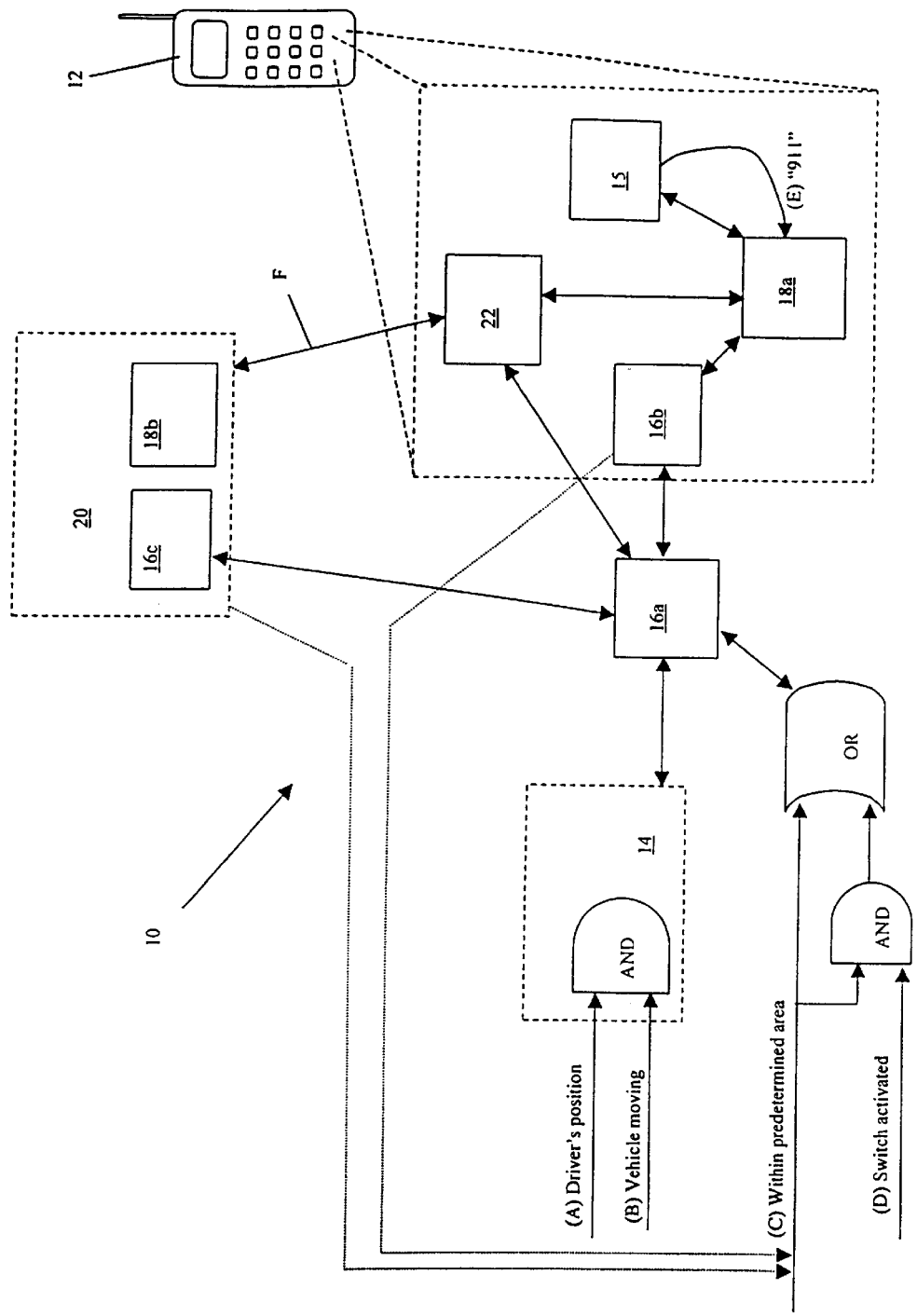
FIG. 1 is a schematic overview of an exemplary system of this invention.
Figure 2:
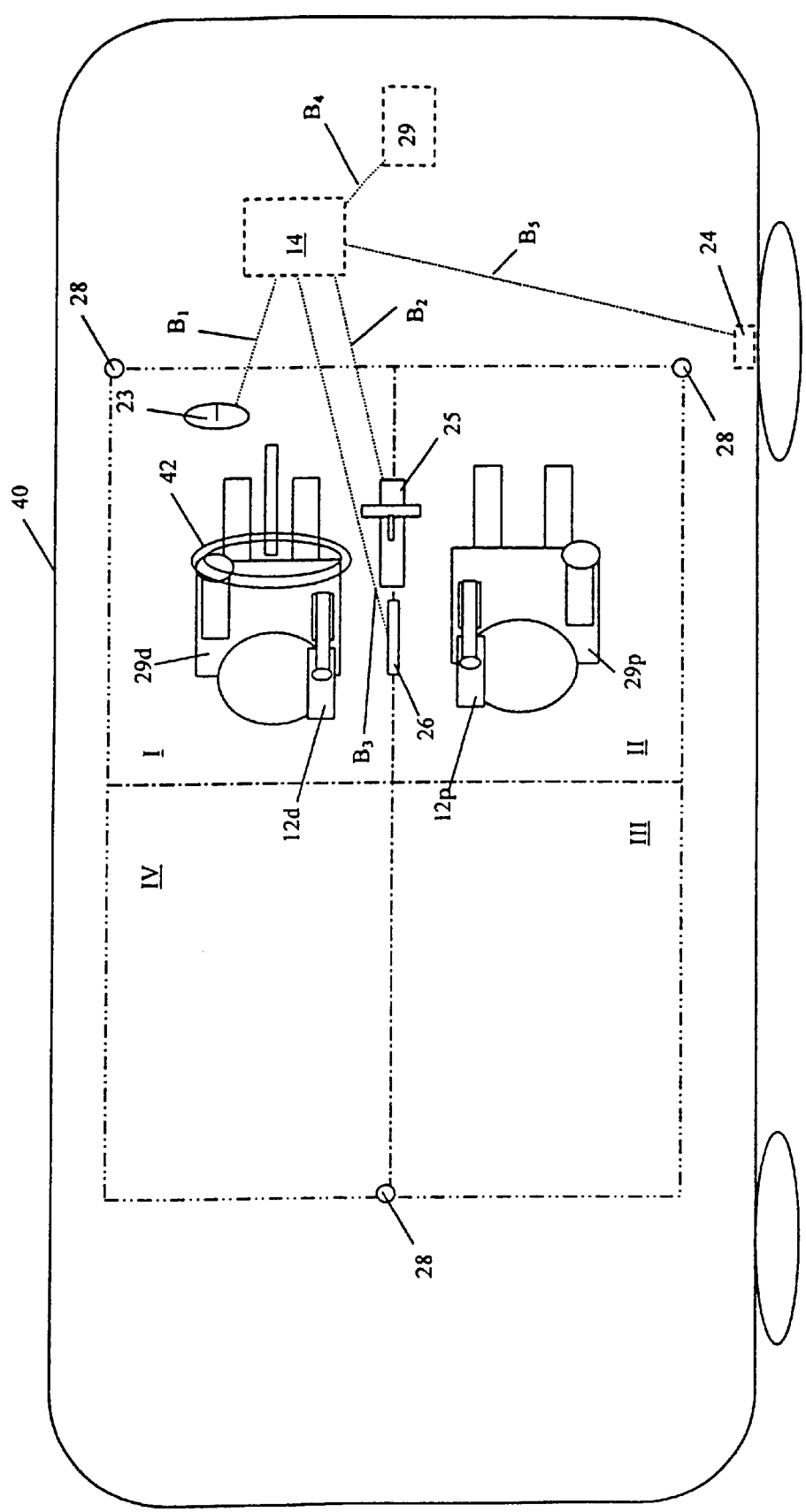
FIG. 2 is a schematic illustration of an exemplary system of this invention for use with a vehicle.
Figure 3:
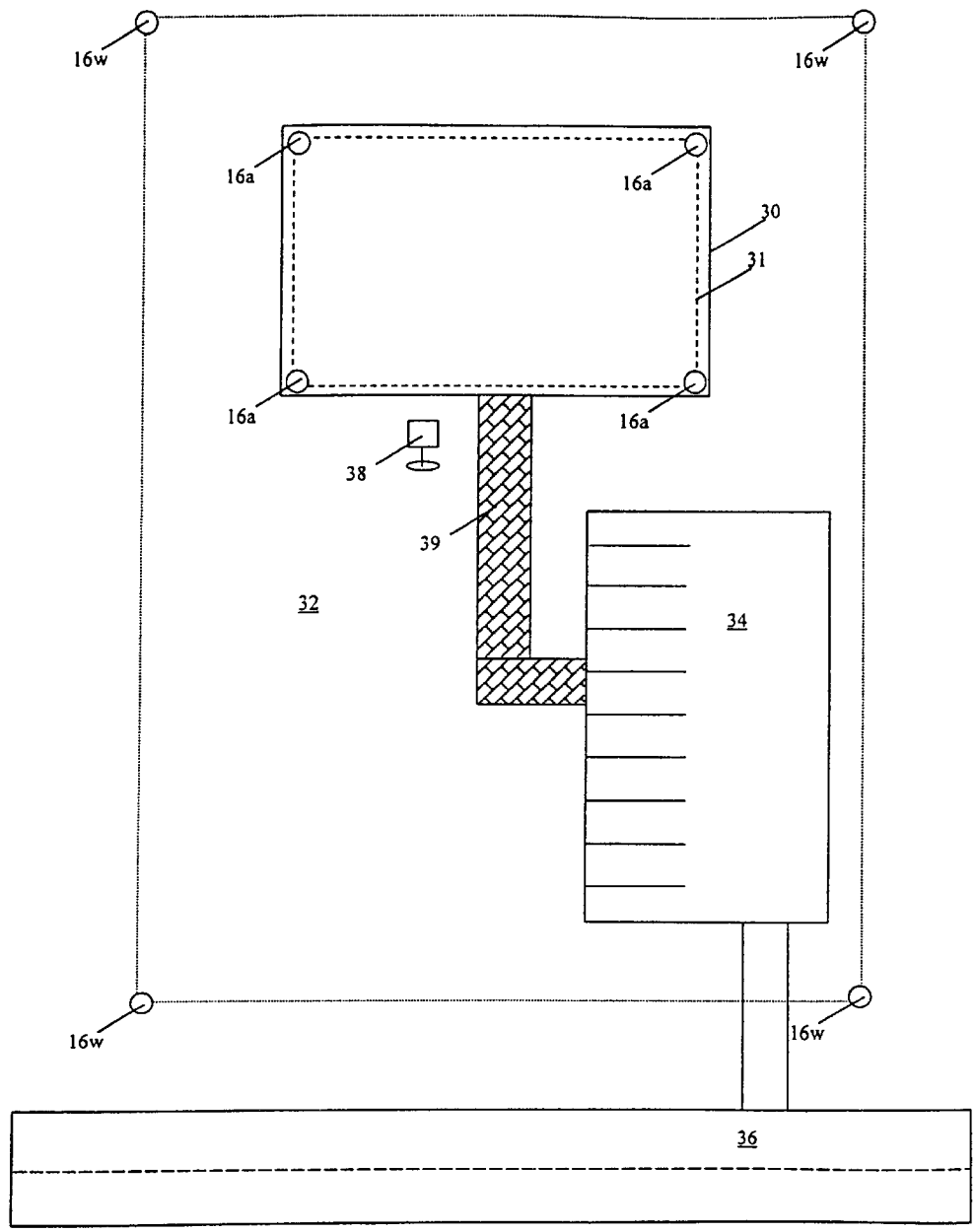
FIG. 3 is a schematic illustration of an exemplary system of this invention for use with a predetermined area.

Referring now to FIGS. 1–3, the invention comprises a system 10 for, under a predetermined set of conditions, selectively disabling use of at least one feature of a stand-alone electronic device 12 having a plurality of features, as shown in FIG. 1. Such conditions may include, for example, conditions indicating that a driver (input A) of a vehicle is attempting to engage in non-emergency use of the electronic device while the vehicle is moving (input B) or that the device is located within a predetermined area (input C), such as a particular building, or that a switch has been activated (input D) while the device is located within the predetermined area. As used herein, the term "predetermined" means chosen to effect a desired result, as opposed to being random.

It should be noted that inputs A–D and the logic shown in FIG. 1 connecting these inputs are merely exemplary. The number and type of inputs, as well as the logical operators that connect the inputs, may comprise any combination that is useful for detecting the desired conditions under which the device is to be partially or fully disabled. The system generally comprises means for establishing the state of the set of conditions as being satisfied or unsatisfied, such as a sensor-input/logic controller 14. The system also comprises means, such as receiver/transmitters 16a, 16b, and/or 16c, for communicating the state to electronic device 12 or to a service provider 20 for the electronic device. The system further comprises means, such as system controller 18a for the electronic device or system controller 18b for service provider 20, for disabling at least the selected feature or features of electronic device 12 if the state is satisfied. The disabled features may include the audible tone to indicate a call is incoming, the ability to answer that call, or even the ability to send or receive a call at all.

As used herein the term "service provider" refers to the entire system of antennas, interlinks, switching equipment, software, computer systems and the like used by one or more entities to enable the communication to and from the wireless communication device. The service provided may be digital or analog, ground based, or satellite based, text (such as a pager) or voice (such as a telephone)-based, or any combination of the above. Although device 12 is depicted in FIG. 1 as a wireless communication device, such as a cellular phone, satellite phone, two-way radio, or the like, the electronic device may be a stand-alone computer, such as a laptop, notebook, or palm-sized personal assistant, or a pager, electronic game, or any electronic device known in the art or an equivalent thereof. Additionally, although components 22, 16b, 18a, and 15 are depicted as being integrally contained components within device 12, one or more of these components may be external to device 12.

For a vehicular application input B to controller 14 for establishing the state of the vehicle may comprise inputs from a motion detector, such as, as is shown in FIG. 2, input $B_1$ from the speedometer 23 or input $B_5$ from an axle or wheel rotation detector 24, or any type of motion detector as may be known in the art. It should be noted that "vehicle" is not limited to automobiles and trucks, but may include buses, boats, trains, planes, and the like, and thus the corresponding motion detector may be tailored to the specific type of vehicle as is known in the art. Input B may instead or also comprise input $B_2$ from gearshift selector 25, which may indicate whether the vehicle is in "Park" or some other gear, or input $B_3$ from emergency brake sensor 26, indicating whether the brake is engaged. The input may instead be an interface $B_4$ with a centralized vehicle computer 29 that may collect inputs from a number of sensors, including one or more of those discussed above. In fact, controller 14 itself may be a centralized vehicle computer known in the art, except having the various additional inputs, logic, and outputs required for the present invention. These additional components may be provided as an aftermarket add-on to existing vehicle computers, as replacement vehicle computers, or may be provided by the original equipment manufacturer.

Technology for determining the state of the vehicle is known. For example, it is known to provide vehicle-based computers with operating systems configured to prevent display of non-driving-related information when the vehicle is moving, as described in U.S. Pat. No. 5,949,345 to Beckert et al. and incorporated herein by reference. It is also known to blank the screen and deactivate the keyboard of an installed Mobile Radio Data Terminal when a vehicle is in motion, as described in U.S. Pat. No. 5,148,153 to Haymond and incorporated herein by reference. Such technology for determining the state of the vehicle has not been applied to stand-alone electronic devices not installed in or integral to the vehicle, nor has it been applied to wireless telephones, even those installed or integral to the vehicle.

As used herein, the term "stand-alone" is used to designate electronic devices that are not installed in or integral to the vehicle in which they may occasionally travel or installed in or integral to the building in which they may occasionally pass through. Such devices are typically sold, purchased, and used separately from such vehicle or building. The term "wireless telephones" includes one-, two-, or multiple-way, digital or analog, voice-based communication devices that transmit electromagnetic signals at any of a number of selected frequencies rather than being hard-wired to a communications network. Such wireless telephones may, however, be permanently or temporarily "wired" to a vehicle with a power and/or an antenna connection or may be integrally incorporated into the vehicle electronics.

System 10 may particularly be used for selectively preventing non-emergency use of a wireless telephone 12 in a moving vehicle. In such case, the means for determining the set of conditions further includes means for establishing that the use of the telephone is non-emergency use. For example, if the user dials "911," the common number for reporting emergencies, it may not be desirable to disable the telephone. Thus, as shown in FIG. 1, if input E from user interface 15 is received by system controller 18a indicating that, for example, "911" has been dialed, the set of conditions may be considered acceptable, and the operation of the device may not be interrupted or modified. Thus, the means for detecting the set of conditions may comprise multiple controllers, such as a vehicle state sensor and the system controller of the telephone.

Once it has been established that the state of the vehicle is unacceptable, transmitter/receiver 16a may communicate the state to electronic device 12 directly to transmitter/receiver 16b, or to transmitter/receiver 16c of service provider 20, or both. Transmitter/receivers 16a, 16b, and 16c are referred to as transmitter/receivers, but may be either transmitters, receivers, or a combination thereof. The communication between the units may be two-way or one-way, analog or digital. Thus, the means for communicating the state of the conditions to the electronic device may comprise transmitter 16a connected to or integral to controller 14 plus receiver 16b connected to or integral to telephone 12, receiver 16c connected to or integral to service provider 20, or both. The means may also comprise the standard link F between service provider 20 and service provider interface 22 of device 12. The means may further comprise the existing link E between user interface 15 and system controller 18a that indicates non-emergency use. Transmitter/receiver 16a may optionally communicate to service provider link 22, instead of transmitter/receiver 16b, making transmitter/receiver 16b unnecessary.

Although it may be simplest to communicate the vehicle state directly only to wireless telephone 12, there may be some advantages to also or instead transmitting the information to service provider 20. For example, if the service provider knows that the electronic device is disabled, the service provider can provide a message to the caller explaining the status and can offer the caller immediately a choice of options. As used herein, the term "disabled" refers to any state where at least one feature of the device is disabled, including a fully disabled state of the device. The service provider may allow the caller to leave a message that is immediately transferred to a voice mail feature, may allow the caller to request an emergency ring-through to let the driver know that a call is incoming and can be answered if the vehicle is put into the acceptable state, or may allow the caller to be transferred to another number, such as a dispatcher or assistant to the driver who can take a message or answer the caller's question. Even where the state is communicated by transmitter/receiver 16a primarily to transmitter/receiver 16c of service provider 20, a signal may be transmitted by the service provider and received by telephone 12 that causes the telephone to reflect on the user interface 15 that a call has been attempted but not put through because of the phone's unusable state. Service provider 20 may transmit to telephone 12 via the service provider interface 22, or transmitter/receiver 16a may transmit to transmitter/receivers 16b and 16c simultaneously. Conversely, where the primary signal is received by telephone 12, the telephone may send a signal via interface 22 to service provider 20 to indicate its disabled status. This signal may be sent immediately, or only upon contact by the service provider to attempt to place a call.

Thus, the means for partially or fully disabling non-emergency use of the telephone when the state of the vehicle is unacceptable may comprise a circuit that completely blocks all incoming or outgoing calls. The means may also or instead comprise a circuit that allows all or certain incoming calls to ring through, but does not allow the user to answer the call until the vehicle is placed in the acceptable condition. The means may also comprise a circuit that allows only "911" to be called out. The means may comprise some combination of all of the above, each of which may be selectable by the user or depending on other circumstances as programmed into the controlling software or firmware. Other circuits providing for other specific limited use of the device may also be used. The means for disabling telephone 12 may be located entirely within the telephone itself, such as system controller 18a, or may be located within service provider 20, such as system controller 18b, or may comprise a combination thereof. Even where means for partially or fully disabling use is located within telephone 12 itself, service provider interface 22 may notify service provider 20 of the unavailable state of the phone either at any time the service provider attempts to place a call, or immediately upon satisfaction of the conditions. In such case, service provider 20 may provide feedback to the caller as described above.

Where the service provider has provisions for allowing a call to ring through only under certain conditions, the service provider may send out an override signal that is received by interface 22. The override signal may be processed by controller 18a to override the incoming call block on telephone 12, or to emit a different alert signal to indicate that a call has been attempted but blocked. To avoid a new cause of accidents from drivers suddenly diving to the shoulder to take incoming calls, such calls may automatically be routed to voice mail, and the alert provided only after the voice mail has been completed. In such case, the driver will know he or she can pull over at his or her leisure to check voice mail.

With respect to non-vehicular applications, the state of conditions that may disable the telephone may relate to the presence of the telephone within a predetermined area. The "predetermined area" may be for example, a building, a room within a building, a specific location not confined within a building, or an area defined by proximity to a certain object or device. The term "area" is not intended herein as a limitation to two-dimensional space, but rather the "predetermined area" may comprise a three-dimensional volume of space, such as all the floors of a building, only certain floors of a building, all the vertical space above a certain ground-defined perimeter, or any location within a spherical radius of a certain object. Referring now to FIG. 3, for example, a particular building 30 may have transmitters 16a that emit a signal detectable anywhere within a particular footprint 31 within the building that disables any telephones with receivers 16b (as shown in FIG. 1) located therein. In such case, the means for determining if the set of conditions has been satisfied and the means for communicating the state of the conditions to the electronic device comprise the same means. That is, the communication of a signal of a certain strength to the telephone that the telephone can receive only when within the designated area, both determines that the condition has been satisfied and simultaneously communicates the state to the telephone. It should be noted that the zone of disablement can include the entire building or just portions thereof.

In another application, the means for detecting the state may comprise a global positioning system (GPS) that can indicate the position of the telephone and send this information through interface 22 to service provider 20. Service provider 20 may have selected (GPS) coordinates for the predetermined area retained in the memory of controller 18b. Controller 18 may then disable telephone 12 whenever the coordinates of the telephone are within the coordinates corresponding to the predetermined area. The means for communicating the state of the conditions to the telephone or service provider 20 in such an embodiment comprises service provider interface 22 and the means for fully or partially disabling phone 12 may comprise controller 18a or 18b, or some combination thereof.

For such applications, it may also be desirable to provide some warning to the telephone user that he or she is about to lose service. Thus, for example, as shown in FIG. 3, a building 30 within which the telephone is inoperative may have a warning signal in a certain area 32 around the building so that a user engaged in an important call while walking toward such a building knows to stop before he or she enters, so that the call can be completed. Warning area 32 may be defined such that only a person pulling into parking lot 34, for example (but not passers-by on road 36) receives the warning. The alert may be a special audible ring tone or vibration signal, or may comprise a spoken interruption to the telephone conversation to the effect of: "WARNING: YOU ARE ABOUT TO ENTER A DESIGNATED AREA WHERE PHONE SERVICE WILL BE INTERRUPTED. PLEASE REMAIN OUTSIDE THE DESIGNATED AREA TO AVOID LOSING SERVICE." A separate visible warning sign 38 adjacent walkway 39 leading to building 30 may be posted to indicate a line that should not be crossed to avoid losing service.

In yet another application, it may be desirable to prevent the use of telephones only under certain conditions. For example, a theater may only want to prevent phone use while the entertainment is being performed or the movie is playing. A recording studio, movie director, or television crew may only want to disable communications that could possibly disrupt the recorded action. In all of such cases, the disabling signal that stops the phone from working may be a manually or automatically thrown switch (input D, as shown in FIG. 1). Thus, the usher, director, member of the crew, or the like may manually throw the switch, or the switch may be automatically interlocked to, for example, the film projector, theater curtain, or camera operation. When the switch is thrown, a transmitter 16a may transmit a signal which is received directly by receiver 16b on electronic device 12 if within the predetermined area, or the signal may be received by receiver 16c of service provider 20, who in turn evaluates the position of device 12 and disables device 12 via service provider interface 22 only if the device is in the predetermined area.

It should be understood that all of the above situations as described with respect to telephones may also be applied to other wireless communications devices as well as non-communications electronic devices such as computers, pagers, and electronic games. For situations where the use of the phone, pager, or electronic game is merely an annoyance, such as within a theater, the operation of the electronic device may not be completely disabled, but instead may be merely flipped automatically to silent operation. Thus, upon walking into a designated area, someone with a loud, annoying pager may have their pager automatically flipped to a vibration mode while in the confines of the designated area. Similarly, a telephone may be disabled from being answered or placing a call, but incoming calls may be allowed to ring through only in vibration mode, with a message displayed on the telephone to let the user know that he or she must exit the building to actually answer the call.

Although it may be desirable to disable telephone 12d of driver 29d, as shown in FIG. 2, it may be further desirable to allow passenger 29p to talk on his or her phone 12p. Therefore, the means for detecting the state of the set of conditions may, in addition to determining whether the use is non-emergency use and whether the vehicle is moving, may also determine whether the user is the driver of the car (as shown by input A in FIG. 1). That is, if the electronic device is within the driver's quadrant I, as shown in FIG. 2, the electronic device may not work, but if it is located in any of the other quadrants II–IV, it may. This functionality may be provided by sending out a disabling signal that is only detectable in quadrant I, or by detecting the location of the electronic device in the car and conveying this information to the service provider. It should be noted that although vehicle 40 is shown having the steering wheel 42 traditionally placed for right-hand-side of the road driving as is the standard in the United States, the placement of the steering wheel may also be on the opposite side of the car.

To outwit the driver who would merely lean dangerously out of his or her quadrant while talking on the phone, the means for detecting if the conditions have been satisfied may comprise a "passenger detector," such as a weight, motion, or heat detector directed to one or more of the seats in the other quadrants. In the alternative, the defined area of quadrant I may be so large as to practically preclude any such reaching, while still allowing the other passengers ample room to use their devices. To provide information about the location of the device, controller 14 may additionally comprise a signal detector or inputs from one or more remotely located signal detectors that are capable of recognizing the location of the electronic device based on the strength and/or direction of the signal. In particular, the use of at least three signal detectors 28 placed about the driver/passenger compartment enables the location of the signal to be determined by "triangulation," as is known in the art.

Where the state of the vehicle is communicated to service provider 20 rather than to electronic device 12 directly, the information provided to the service provider may include identifying characteristics relating to the phone to be disabled. Where transmitter 16a transmits the signal directly to electronic device 12, the strength and characteristics of the signal are such that only an electronic device in driver's quadrant I is affected, and not electronic devices of passengers in that vehicle or in adjacent vehicles.

For standardization, the transmission and receiving signal characteristics (frequency, digital or analog code, etc.) for disabling the telephone are preferably the same for each type of vehicle and each type of electronic device to be disabled. Thus, each type of electronic device may have different signal characteristics to provide selectivity by device. Furthermore, different signal characteristics may be used to fully disable versus partially disable, such as for example, one characteristic signal for a building which merely switches off the audible alert tones, and another characteristic signal for a vehicle where all non-emergency use is to be disabled. The term "characteristic" as used herein refers to any feature of a signal that may be used to distinguish it from another signal, such as frequency, amplitude, pulse pattern, or the digital information carried by the signal.

Another use for different signal characteristics may be especially beneficial with respect to buildings in which the electronic device is disabled, as described above with respect to FIG. 3. One type of signal may be provided by transmitters 16a within a first predetermined area 30 where the device is fully or partially disabled, and another signal may be provided by transmitters 16w within a second predetermined area 32 that is the warning area. Where both signals overlap, logic within system controller 18a may merely dictate that the signal from 16a prevails. Similarly, if it is desired to provide a safe area where devices are is not disabled within the boundaries of area where devices are disabled, a second signal may be transmitted and received only within the safe area and the system logic programmed such that the receipt of the "safe" signal overrides receipt of the "disable" signal.

The ability to disable devices in certain predetermined areas may also be advantageous with respect to certain electronic equipment that is sensitive to signals of certain frequencies that may cause unwanted interference. Such sensitive equipment may be located in hospitals or airplanes, for example, and are often responsible for the blanket requirement that certain electronic devices be banned from use within the confines of the hospital or within the airplane during takeoff. The present invention, although it depends upon wireless communication between a transmitter and the electronic device for instructions to turn the device off, may still be compatible with deactivating the use of certain devices around sensitive equipment. Most such sensitive equipment is not sensitive to all radio frequencies, and thus the use of other frequencies may not cause interference. Blanket rules requiring that all devices be turned off are generally a more practical solution than requiring testing at all frequencies and distinguishing devices based upon emitted frequencies. For the present invention, however, the communication for defining the predetermined area within which the device is disabled can be carried out at a known frequency where no interference is known to occur. In this way, the communication to define the predetermined area where the device is deactivated may be at a frequency that does not interfere with the sensitive equipment, whereas routine use of the device may create a signal that does cause such interference.

It should be understood that although an integrated system including the electronic device and the various means for establishing the state of the set of conditions, communicating to the electronic device, and at least partially disabling the electronic device, the individual components of that system may be made by different manufacturers and offered separately. Thus, the electronic devices as well as the controllers for establishing the state of conditions and communicating the state to the electronic devices are defined, separate elements of this invention.

Accordingly, the invention further comprises a stand-alone electronic device, wireless telephone, or combination thereof, having a plurality of features and adapted to have at least one feature disabled under a predetermined set of conditions, the device comprising means for receiving a communication that the set of conditions has been satisfied and means for disabling the feature in response to receipt of the communication. The invention also comprises a controller comprising means for establishing a state of the set of conditions as being satisfied or unsatisfied and means for communicating the state to the electronic device, wireless telephone, or service provider for the telephone.

It should also be noted that although the terms "logic" and "software" are used throughout with respect to the means used for decision-making and activation or deactivation of features of the electronic devices, no limitation is intended to any particular means for effecting the various functions. The logical means may include analog or digital logic, software, firmware, hardware, or any means known in the art. The software or firmware may be embodied as a computerized set of instructions in any computer language and embodied in any type of machine for storing such instructions as is known in the art.

Thus, the invention also comprises the computer program products resident in the electronic devices or the controllers that communicate the state to the electronic devices. Such computer program products comprise at least one program storage device readable by a machine, tangibly embodying a program of instructions executable by the machine to perform the method steps for, under a predetermined set of conditions, selectively disabling use of at least one selected feature of a stand-alone electronic device having a plurality of features. The method steps performed by the program for the electronic device comprises receiving an input indicating the set of conditions has been satisfied, and disabling the feature in response to the input. For at least partially disabling non-emergency use of a wireless telephone in a vehicle, the method steps comprise establishing that the use is emergency or non-emergency use, receiving a communication indicating that non-emergency use of the telephone should be disabled, and disabling non-emergency use of the telephone in response to the communication. Such program can reside at least in part within the wireless telephone, the service provider, or a combination thereof. For a controller, the method steps comprise establishing the: state of the set of conditions as being satisfied or unsatisfied and communicating that state to the electronic device, wireless telephone, or service provider for the wireless telephone.

Those skilled in the art having the benefit of the teachings of the present invention as set forth herein above, can effect numerous modifications thereto. These modifications are to be construed as being encompassed within the scope of the present invention as set forth in the appended claims.

What is claimed:

1. A system for selectively disabling use of at least one feature of a stand-alone electronic device, the device having a plurality of features, in response to a predetermined set of conditions of the electronic device being satisfied, the system comprising:

the stand-alone electronic device comprising having the plurality of features;

means for establishing a state of the set of conditions as being satisfied or unsatisfied, the predetermined set of conditions comprising conditions indicating location within a predetermined area having a fixed boundary that is independent of a communications network cell boundary;

means for communicating the state to the electronic device; and means for completely disabling the selected feature if the state is satisfied.

2. The system of claim 1 wherein the device comprises a wireless communication device.

3. The system of claim 1 wherein the device comprises a computer.

4. The system of claim 1 wherein the predetermined set of conditions further comprises conditions indicating non-emergency use of the device.

5. The system of claim 1 wherein the predetermined set of conditions further comprises activation of a switch controlled by an entity other than a user of the device.

6. The system of claim 1 comprising a global positioning system for indicating location within the predetermined area.

7. The system of claim 1 wherein the predetermined area comprises a building.

8. The system of claim 1 wherein the predetermined area comprises an area defined by proximity to a predetermined object.

9. The system of claim 1 further comprising means for determining if a user is within a warning area adjacent the predetermined area, and means for providing a warning signal indicating proximity to the predetermined area to a user within the warning area.

10. The system of claim 1 wherein the means for disabling the electronic device resides within the electronic device.

11. The system of claim 1 wherein the electronic device comprises a wireless communications device usable through a service provider.

12. The system of claim 11 wherein the means for disabling the wireless communications device resides at least in part with the service provider.

13. The system of claim 11 wherein the system further comprises means for indicating to a party trying to reach a disabled electronic device that the device is disabled.

14. The system of claim 1, wherein the at least one feature comprises a feature selected from the group consisting of: the ability to transmit a signal from the electronic device, the ability of the device to emit an audible sound, or a combination thereof.

15. A system for selectively at least partially disabling non-emergency use of a wireless telephone in a vehicle, the system comprising:
   the wireless telephone;
   the vehicle;
   means for establishing that the use is emergency or non-emergency use;
   means for establishing a state of the vehicle, and optionally a position of the telephone within the vehicle, as being acceptable or unacceptable for non-emergency use of the telephone;
   means for communicating the state to the telephone, to a service provider for the telephone, or both; and
   means for disabling non-emergency use of the telephone when the state is unacceptable.

16. The system of claim 15 wherein the telephone is temporarily or permanently wired to the vehicle via a power connection, an antenna connection, or both.

17. The system of claim 15 further comprising means for indicating on a user interface of the wireless telephone that the telephone is at least partially disabled.

18. The system of claim 15 further comprising means for indicating on a user interface of the wireless telephone that an attempt has been made to reach the telephone while disabled.

19. The system of claim 15 further comprising means for indicating to a party attempting to contact a user of a disabled telephone that the telephone is disabled.

20. The system of claim 19 further comprising means for providing the party attempting to contact the user with one or more options as an alternative to contacting the user.

21. The system of claim 15 wherein the means for establishing the state of the vehicle comprises one or more of a gearshift selector, an emergency brake sensor, a motion detector, a weight sensor in a seat, a set of signal triangulation sensors, or an interface with a centralized vehicle computer.

22. The system of claim 21, wherein the motion detector, comprises a speedometer measurement or a wheel or axle rotation detector.

23. The system of claim 21, wherein the predetermined set of conditions further comprises conditions indicating location within a predetermined area where the predetermined area is the driver's quadrant of a vehicle.

24. A stand-alone electronic device having a plurality of features and adapted to have at least one feature selectively disabled under a predetermined set of conditions, at least one such condition comprising location within a predetermined area having a fixed boundary that is independent of a communications network cell boundary, the device comprising:
   means for receiving a communication for indicating that the set of conditions has been satisfied, including that the device is located within the predetermined area; and
   means for disabling the selected feature in response to the communication indicating that the set of conditions has been satisfied.

25. A computer program product comprising at least one program storage device readable by a machine, tangibly embodying a program of instructions executable by the machine to perform the method steps for, under a predetermined set of conditions, at least one such condition comprising location of the device within a predetermined area having a fixed boundary that is independent of a communications network cell boundary, selectively disabling use of at least one selected feature of a stand-alone electronic device having a plurality of features, the method steps comprising:
   (a) receiving an input indicating that the set of conditions has been satisfied, including that the device is located within the predetermined area; and (b) disabling the feature in response to the input.

26. A wireless telephone adapted to be at least partially disabled for non-emergency use based upon a state of a vehicle in which the telephone is located, the telephone comprising:
   means for establishing whether a use is emergency or non-emergency use;
   means for receiving a communication indicating a state of the vehicle in which non-emergency use should be disabled; and
   means for at least partially disabling non-emergency use of the telephone in response to the communication.

27. A computer program product comprising at least one program storage device readable by a machine, tangibly embodying a program of instructions executable by the machine to perform a set of method steps for at least partially disabling non-emergency use of a wireless telephone based upon a state of a vehicle in which the telephone is located, the method steps comprising:
   (a) determining whether an attempted use is emergency or non-emergency use;
   (b) receiving an input indicating a state of the vehicle in which non-emergency use should be disabled; and
   (c) disabling non-emergency use of the telephone in response to the input.

28. The program of claim 27 wherein the program product resides at least in part within the telephone.

29. The program of claim 27 wherein the program product resides at least in part within a service provider for the telephone.

30. A controller for use with a system for, under a predetermined set of conditions, providing a communication to cause at least one feature to be disabled of a wireless telephone having a plurality of features, the controller comprising:
   means for determining if the set of conditions has been satisfied; and
   means for sending the communication to the wireless telephone, service provider for the wireless telephone, or a combination thereof, if the set of conditions are satisfied;

wherein the set of conditions comprises conditions indicating location of the wireless telephone within a predetermined area having a fixed boundary that is independent of a communications network cell boundary or wherein the controller is located within a vehicle and the means for determining the set of conditions comprises means for determining if the vehicle is moving or engaged to be moved and means for determining if the wireless telephone is within a predetermined position within the vehicle.

31. A computer program product comprising at least one program storage device readable by a machine, tangibly embodying a program of instructions executable by the machine to perform the method steps for, under a predetermined set of conditions, providing a communication to cause at least one feature to be disabled of a wireless telephone having a plurality of features, the method steps comprising:

(a) establishing a state of the set of conditions as being satisfied or unsatisfied; and (b) sending the communication to the, wireless telephone, a service provider for the wireless telephone, or a combination thereof; wherein the set of conditions comprises conditions indicating location of the wireless telephone within a predetermined area having a fixed boundary that is independent of a communications network cell boundary or conditions indicating location within a predetermined position in a vehicle that is moving or engaged to be moved.

* * * * *

UNITED STATES PATENT AND TRADEMARK OFFICE
CERTIFICATE OF CORRECTION

PATENT NO. : 6,690,940 B1 Page 1 of 1
APPLICATION NO. : 09/668099
DATED : February 10, 2004
INVENTOR(S) : James W. Brown, George W. Brown and Charles F. Brown It is certified that error appears in the above-identified patent and that said Letters Patent is hereby corrected as shown below:

Title page, item [57]

In the Abstract:

In the third sentence, line 7 after the word "may", delete the word "be".

Column 8, line 67, after the word "are", delete the word "is"

Column 10, line 20, after the word "the", delete the punctuation mark ":"

Column 10, Claim 1, line 35, after the word "device", delete the word "comprising".

Signed and Sealed this

Fourth Day of November, 2008

JON W. DUDAS
*Director of the United States Patent and Trademark Office*